United States Patent [19]

Strauss et al.

[11] Patent Number: 5,790,328

[45] Date of Patent: Aug. 4, 1998

[54] VEHICULAR VISUAL SAFETY DEVICE

[75] Inventors: Arthur D. Strauss, Marlborough, Conn.; Robert L. Morris, II, Burlington, Vt.

[73] Assignee: Automotive Control Technologies, Inc., East Dorset, Vt.

[21] Appl. No.: 743,315

[22] Filed: Nov. 5, 1996

[51] Int. Cl.⁶ .............. G02B 5/08; G02B 5/10; G02B 7/182; B60R 1/04

[52] U.S. Cl. .............. 359/856; 359/863; 359/865; 359/872; 359/877

[58] Field of Search .............. 359/856, 857, 359/858, 861, 862, 863, 865, 872, 877

[56] References Cited

U.S. PATENT DOCUMENTS

| | | | |
|---|---|---|---|
| 1,666,236 | 4/1928 | Fuerth . | |
| 1,719,342 | 7/1929 | Rodgers, Jr. | 359/862 |
| 1,748,837 | 2/1930 | Greensfelder . | |
| 1,768,191 | 6/1930 | Crook . | |
| 1,870,468 | 8/1932 | Ross . | |
| 1,918,802 | 7/1933 | Fleischer . | |
| 2,137,440 | 11/1938 | Boeve | 359/862 |
| 2,250,896 | 7/1941 | Stokesbary | 359/862 |
| 2,302,952 | 11/1942 | Pfeifer | 359/862 |
| 2,796,003 | 6/1957 | Kaufman | 359/862 |
| 4,172,638 | 10/1979 | Freedman | 350/302 |
| 4,268,120 | 5/1981 | Jitsumori | 350/302 |
| 4,349,247 | 9/1982 | Koyama et al. | 350/302 |
| 5,237,459 | 8/1993 | Strauss | 359/863 |

FOREIGN PATENT DOCUMENTS

| | | | |
|---|---|---|---|
| 0437670 | 6/1949 | Italy | 359/862 |
| 0498100 | 3/1956 | Italy | 359/862 |

*Primary Examiner*—Ricky D. Shafer
*Attorney, Agent, or Firm*—Wolf, Greenfield & Sacks, P.C.

[57] ABSTRACT

A vehicular visual safety device having a pair of substantially parallel mirrors secured within the interior of the vehicle in fixed relationship with the driver. The rear-most mirror is positioned so as to capture an image lateral and forward of the device's position below the level of the front view window and front portion of the vehicle on the side of the vehicle opposite to the driver's position. The forward-most mirror is laterally offset towards the driver relative to the rear-most mirror and is positioned so as to capture an image of the rear-most mirror. Specifically, the vehicular visual safety device includes a mirror assembly having a planar reflecting forward-most mirror and a convex object rear-most mirror each having an upper edge that lies in respective vertical planes that are substantially parallel with each other. A frame assembly is provided to adjustably secure the mirror pair within the vehicle. The frame assembly has substantially parallel forward and rear tracks that adjustably receive the forward-most and rear-most mirrors, respectively. The mirrors may be laterally rotated and secured at any one of many predetermined locations along their respective tracks. The mirrors may also be pivotally adjusted about any axis. Thus, the apparatus is fully adjustable, accommodating the visual line of sight of individual drivers. These adjustments may be performed manually or in a mechanized manner.

27 Claims, 8 Drawing Sheets

VEHICULAR VISUAL SAFETY DEVICE

BACKGROUND OF THE INVENTION

1. Field of the Invention

This invention relates generally to vehicular visual safety devices and, more particularly, to a mirror apparatus mounted in the passenger compartment of the vehicle having a pair of mirrors arranged to provide the driver with a view of a blind area opposite the driver's position and forward of the driver's position.

2. Related Art

In large-size trucks and other vehicles where the driver's position is located at a substantial distance above the ground, there exists a blind area on the external side of the vehicle located opposite to the driver's position forward of the front view window. This blind area is essentially that area obscured by the vehicle's own structure. Specifically, this area is obstructed primarily by the hood, opposite front fender and dashboard of the vehicle and, depending on the size of the driver's compartment and cab, may extend for a significant distance away from the opposite front portion of the cab. It is not uncommon for a pedestrian, motorized vehicle or other fixed or movable object to be within this blind area and, therefore, unknown to the driver of the vehicle. Under such circumstances, when the driver turns the vehicle in the direction of the blind area, the vehicle may collide with the unknown pedestrian, vehicle or object.

A number of conventional mirror devices have been utilized in an attempt to eliminate this dangerous blind spot. However, these devices, which are generally mounted outside of the vehicle and forward of the windshield, provide visualization of only a small portion of this blind area. As a result, these mirror assemblies do not provide the driver with an image of a significant and therefore dangerous portion of the blind spot. Furthermore, outside-mounted devices are subject to environmental effects that reduce visibility, thereby not providing a clear image of the viewing area. In addition, these conventional mirrors are subject to damage and theft, making them costly to maintain and may even contribute to the blind area by further obstructing the driver's view. Furthermore, these mirrors are a considerable distance from the driver and present only a small, detailed field of view.

Other conventional mirror devices include four or more mirrors mounted separately throughout the interior of the vehicle. These devices are often subject to misalignment of the mirrors due to the number of times the image is reflected off of one of the mirrors. In addition, obstruction of the image path often occurs due to either passengers or articles contained in the interior of the vehicle.

One conventional technique is described in U.S. Pat. No. 5,237,459 to Arthur Strauss, and is owned by the assignee of the present invention. This device includes a pair of internally-mounted mirrors to provide the driver with a view of an area lateral, forward and below the level of the front windshield. A drawback to this approach is that the relative position of the mirrors is such that they must be positioned at an acute angle relative to each other in order to provide the driver with a view of a portion of the blind area. However, the forward mirror is positioned immediately adjacent to the front view window preventing it from being fully rotated about its vertical axis. This limits the available arrangement of the mirrors resulting in a dangerous portion of the blind spot to remain out of view. Furthermore, the rear mirror is laterally positioned between the driver and the forward mirror, reducing the portion of the front mirror that is visible to the driver. This results in a further loss of visible area external to the vehicle. As a result of these drawbacks, even when optimally positioned, this mirror apparatus provides a limited view of the blind spot that exists lateral, forward and below the level of the front windshield. Thus, a dangerously large portion of this blind area that is obstructed by the vehicle remains out of the view of the driver.

In addition, the means employed to secure the mirror assembly to the front view window is unstable and susceptible to vibrations, particularly in truck cab applications. As a result, the mirror assembly does not stay stationary or falls from the window while the vehicle is moving. Finally, the front window mounts are incapable of successfully mounting the mirror assembly in certain truck cabs having a front view window with little or no rake.

What is needed, therefore, is a reliable vehicular visual safety device that enables the driver of the vehicle to see substantially all of the area lateral, forward and below the level of the front windshield and front portion of the vehicle on the side of the vehicle opposite the driver that is otherwise obstructed by the vehicle.

SUMMARY OF THE INVENTION

The present invention is a vehicular visual safety device having a pair of substantially parallel mirrors secured within the interior of the vehicle in fixed relationship with the driver. The rear-most mirror is positioned so as to capture an image lateral and forward of the device's position below the level of the front view window and front portion of the vehicle. The forward-most mirror is laterally offset towards the driver relative to the rear-most mirror and is positioned so as to capture an image of the rear-most mirror and reflect such image to the driver. This novel arrangement of mirrors enables the driver to view the forward-most mirror substantially unobstructed by the rear-most mirror, providing the driver with a view of a substantial area external to the opposite side of the vehicle lateral, forward and below the level of the front view window and front portion of the vehicle, the view of which is otherwise obstructed by the vehicle hood, fender, dash board and other vehicle structures. This mirror system is mounted inside the passenger compartment of the vehicle, safe from outside weather, vandalism, and in close proximity to the driver such that the driver can easily glance at the mirrors and understand the image being presented.

Specifically, the vehicular visual safety device of the present invention includes a mirror assembly having a planar reflecting forward-most mirror and a convex object rear-most mirror each having an upper edge that lies in respective vertical planes that are substantially parallel with each other. In one preferred embodiment of the present invention, a frame assembly is provided to adjustably secure the mirror pair within the vehicle. The frame assembly preferably has substantially parallel forward and rear tracks that adjustably receive the forward-most and rear-most mirrors, respectively. The mirrors may be laterally rotated and secured at any one of many predetermined locations along their respective tracks. The mirrors may also be pivotally adjusted about any axis. Thus, the present invention is fully adjustable, accommodating the visual line of sight of individual drivers. These adjustments may be performed manually or in a mechanized manner.

In another embodiment of the present invention, the frame is secured to a roof structure of the vehicle, such as with brackets. In accordance with a preferred embodiment of the invention, the brackets are pairs of adjustable opposing clips for removably securing the frame to a sun visor on the passenger side within the vehicle. One or more of the clips is adjustable along substantially parallel clip channels in the frame to accommodate visors of various widths and thicknesses. In alternative embodiments, other types of brackets may be used to secure the frame to a different roof structure. In still another embodiment of the present invention, the frame or the mirrors themselves are directly secured to a roof structure, including, for example, a roof panel, rear panel, or door frame of the vehicle.

Significantly, this novel arrangement of mirrors advantageously enables a driver to view substantially all of the otherwise obstructed area lateral, forward and below the level of the front view window and front portion of the opposite side of the vehicle. The ability to adjustably yet securely position the mirrors along their respective tracks as well as the ability to securely pivot the mirrors about any axis enables the present invention to provide a universal design that fits all vehicle cabs, accommodates all size drivers, and is not susceptible to the vibrations experienced in most vehicles. This is particularly significant in truck cab applications where road vibrations can be severe and constant for long periods of time. In addition, in the preferred embodiment wherein the frame is attached to the passenger sun visor, the frame itself may be laterally adjusted along the visor to provide greater lateral (when moved towards the driver) or forward (when moved away from the driver) views.

Another advantage of the present invention is the ability to easily adjust the mirrors laterally along the frame tracks and pivotally about any axis. In addition, such adjustments may be made either manually, mechanically through the use of cables, or with motors remotely controlled via a control panel adjacent to the driver's position. This later embodiment is particularly useful for unassisted drivers and individuals that cannot easily reach the mirrors from the driver's position.

An additional advantage of the present invention is that it is secured to the interior of the vehicle cab in a manner that is less affected by vibration than conventional mirror arrangements. In addition, this inside application prevents weather conditions from impairing the driver's view, prevents rust and corrosion, and protects the mirrors from breakage and theft.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Figure 1:
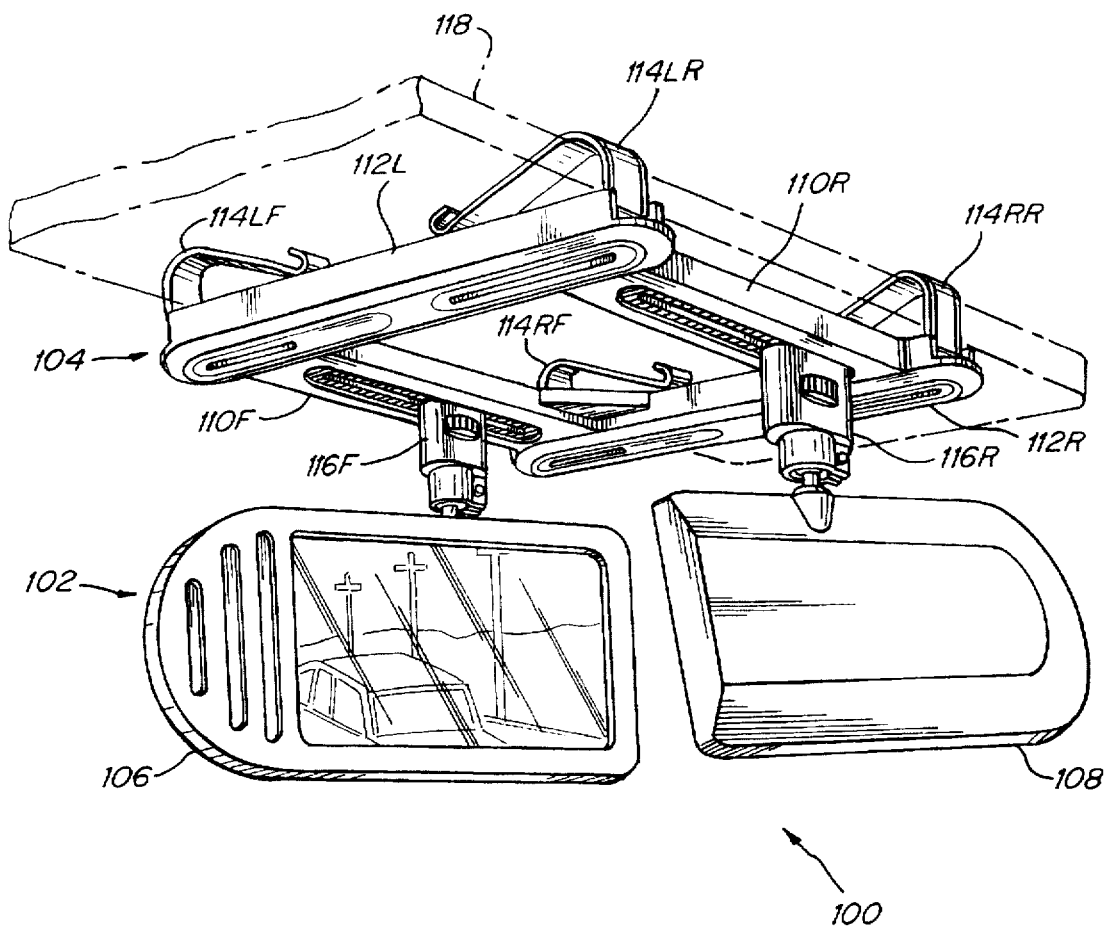
FIG. 1 is a perspective view of the preferred embodiment of the vehicular visual safety device of the present invention.

A perspective view of a preferred embodiment of the vehicular visual safety device 100 of the present invention is illustrated in FIG. 1. Generally, the vehicle visual safety device 100 includes a pair of mirror assemblies 102 and a frame assembly 104 for securing the mirror pair 102 to a roof structure in the passenger compartment of the vehicle cab.

The mirror pair 102 preferably includes a planar reflecting mirror assembly 106 and an opposing convex object mirror assembly 108. As will be explained in detail below, planar reflecting mirror 106 is positioned adjacent to the front view window of the vehicle towards the front of the vehicle relative to the convex object mirror assembly 108. Conversely, the convex object mirror 108 is positioned towards the rear of the vehicle relative to the planar reflecting mirror 106. The planar reflecting mirror assembly 106 and the opposing convex object mirror assembly 108 are substantially parallel mirrors secured within the interior of the vehicle in fixed relationship with the driver. The rear-most mirror assembly 108 is positioned so as to capture an image lateral and forward of the device's position below the level of the front view window and front portion of the vehicle. The forward-most mirror assembly 106 is laterally offset towards the driver relative to the rear-most mirror and is positioned so as to capture an image of the rear-most mirror and reflects it to the driver. As described below, this novel arrangement of mirrors enables the driver to view the forward-most mirror substantially unobstructed by the rear-most mirror, providing the driver with a view of a substantial area external to the opposite side of the vehicle lateral, forward and below the level of the front view window and front portion of the vehicle that would otherwise be obstructed by the vehicle structure.

Frame assembly 104 preferably contains substantially parallel sides 110F (front) and 110R (rear) providing tracks for laterally adjusting mirrors assemblies 106 and 108, respectively. Frame assembly 104 also contains substantially parallel sides 112L (left) and 112R (right) integral with sides 110F and 110R. Sides 112L and 112R are substantially orthogonal with sides 110F and 110R thereby forming a frame assembly 104 having a base with a substantially square cross-section. This enables the base of the frame assembly 104 to be a single, integral lightweight unit of considerable strength and minimal profile so as to reliably secure the mirror assemblies while not obstructing the driver's view or interfering with a passenger should one be present.

Frame assembly 104 preferably includes clips 114LF (left front), 114RF (right front), 114LR (left rear) and 114RR (right rear) The front clips 114LF and 114RF oppose the rear clips 114LR and 114RR, respectively, forming two pairs of opposing clips, one pair on the left side of the frame and one pair on the right. The clip pairs removably secure the frame assembly 104 to a visor 118 shown in phantom in FIG. 1. As will be discussed in detail below, the rear clips 114LR and 114RR are adjustable within channels located in sides 112L and 112R, respectively. Thus, the opposing pairs of clips are adjustable so as to removably secure the frame assembly 104 to visors having other widths and/or thicknesses.

Frame assembly 104 includes adjustable mirror hangers 116F and 116R for adjustably securing mirrors 106 and 108, respectively, to the frame assembly. Mirror hangers 116F and 116R enable the driver to laterally adjust the mirror assemblies 106 and 108 and to secure the mirrors at any one of many predetermined locations along their respective tracks in a manner described below. Hangers 116F and 116R also enable the driver to pivotally adjust each mirror about any axis relative to its respective hanger enabling the mirrors to be fully rotatable. Thus, the present invention is fully adjustable, accommodating the visual line of sight of individual drivers.

Figure 2:
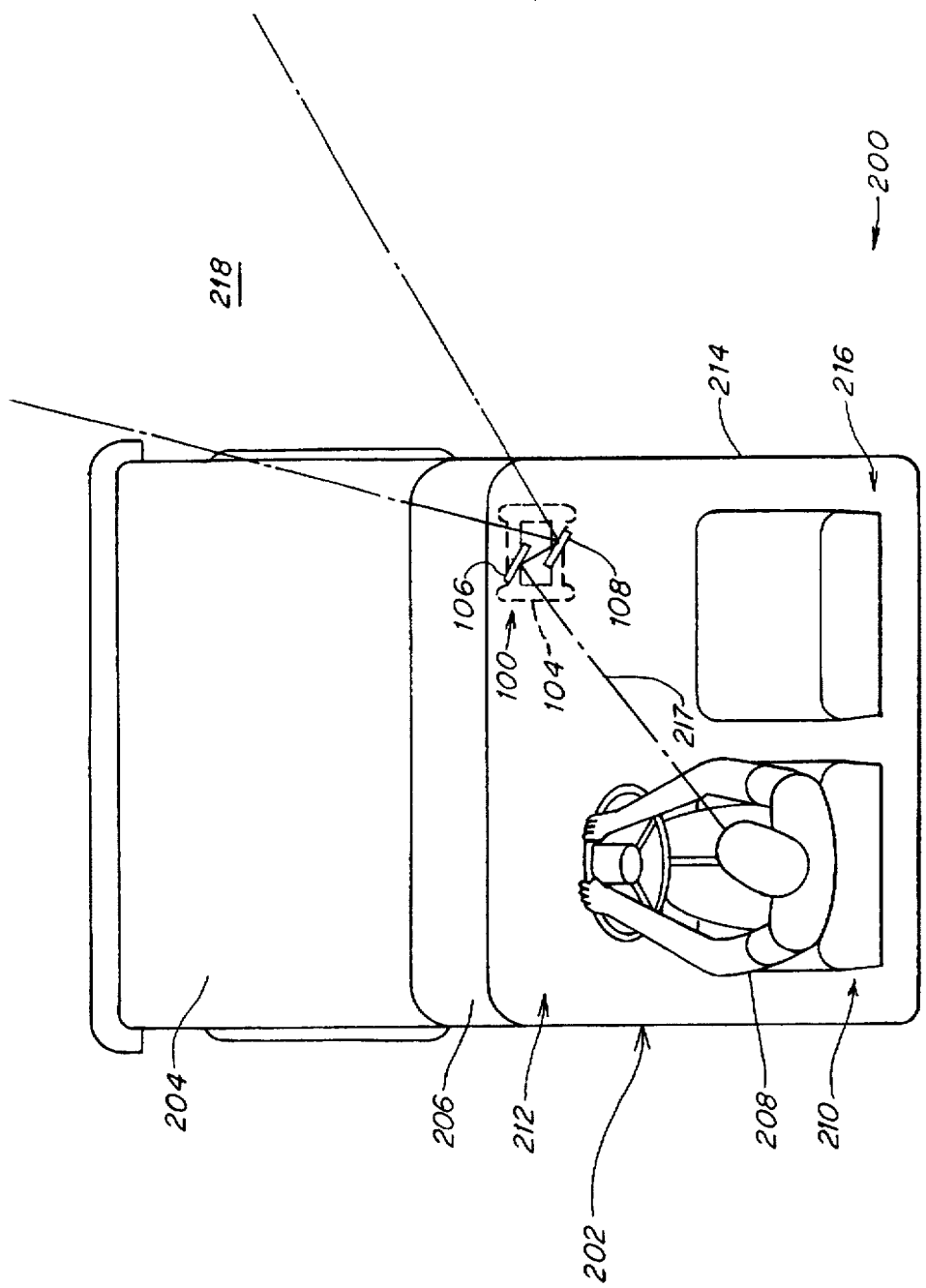
FIG. 2 is a schematic top plan view of the mirror assembly in use in an exemplary vehicle cab.

FIG. 2 illustrates a schematic top plan view of the mirror assembly 100 in use in an exemplary vehicle cab 200. Referring to FIG. 2, vehicle cab 200 has a passenger compartment 202 and a forward-positioned engine compartment 204. Vehicle cab 200 is a conventional truck cab having an engine compartment forward of the passenger compartment. However, the vehicular visual safety device 100 of the present invention may be used in any vehicle including "cab over" truck cabs where the passenger compartment 202 is positioned vertically above the engine compartment 204.

The vehicle cab 200 has a front view window 206. The driver 208 is located in the driver's position 210 in the interior 212 of passenger compartment 202. On the opposite side of the vehicle 214 there is a passenger position 216 in the interior 212 of the passenger compartment 202. The vehicular visual safety device 100 of the present invention is preferably secured to the passenger's visor 118 (not shown in FIG. 2 for clarity) placing the device 100 forward of the driver's position 210 on the opposite side 214 of the passenger compartment 202. For ease of illustration, the frame assembly 104 is shown in phantom in FIG. 2 while mirrors 106 and 108 are shown as thick lines. The driver 208 has an unobstructed line of sight 217 of planar reflecting mirror assembly 106. As noted, mirror assembly 106 is the forward-most mirror relative to mirror assembly 108 and is positioned so as to capture an image of the rear-most mirror 108. The rear-most mirror assembly 108 is positioned so as to capture an image lateral and forward of the device 100 below the level of the front view window 206 and engine compartment 204 of the vehicle cab 200. As will be described in detail below with reference to FIGS. 6A and 6B, this viewed area 218 includes a substantial portion of the blind area in the driver's unassisted view caused by the obstruction of the vehicle's structure.

It should be understood that the field of view 218 shown in FIG. 2 is exemplary only. For example, the rear-most mirror assembly 108 may be adjusted to provide a view of an area that is located laterally towards the opposite side 214 of the vehicle. Such an arrangement may be desirable in a cab-over truck where there is a larger blind spot on the lateral side and relatively little vehicle structure creating a blind area forward of the driver's position. Alternatively, the rear-most mirror assembly 108 may be adjusted to provide a view of an area that is located forward of the driver's position. Such an arrangement may be desirable in a truck having the engine compartment forward of the passenger compartment as shown in FIG. 2. In addition, in the embodiment wherein the frame 104 is mounted to a passenger sun visor with adjustable clips, the frame assembly 104 may be adjusted laterally along the visor to assist in obtaining the above field of views.

Figure 3:
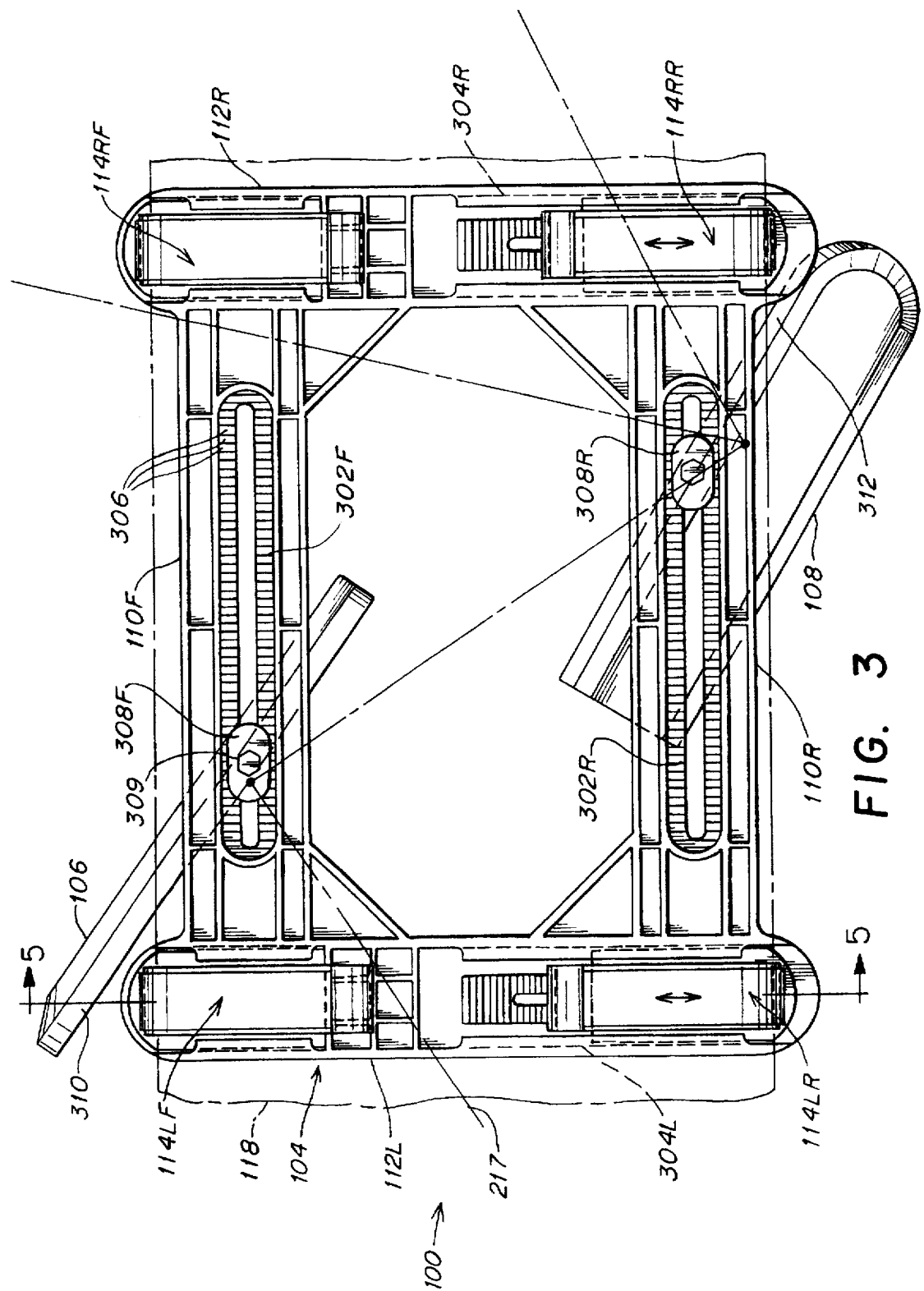
FIG. 3 is a top plan view of the vehicular visual safety device of the present invention.

FIG. 3 is a top plan view of the vehicular visual safety device 100 of the present invention. As noted above, substantially parallel front and rear sides 110F and 110R laterally support mirror assemblies 106 and 108, respectively. Integral with sides 110F and 110R are substantially parallel sides 112L and 112R providing means for securing the frame assembly 104 to the visor 118 (shown in phantom).

Sides 110F and 110R contain integral mirror tracks 302F and 302R, respectively. Mirror tracks 302 contain numerous teeth 306 that engage a vertically adjustable clamp 308 of hangers 116 to secure the respective mirror assembly in a desired lateral position. The top plan view of FIG. 3 illustrates the relative lateral positions of front mirror assembly 106 and rear mirror assembly 108. Front-most mirror assembly 106 is laterally offset towards the driver's position 210 relative to rear-mirror assembly 108. Correspondingly, rear-most mirror assembly 108 is offset towards the right side 214 of the cab 200 relative to the front-most mirror 106. This relative lateral position of mirrors 106 and 108 provide the driver with a clear, unobstructed line of sight 217 of the front-most mirror 106.

For ease of manufacturing, in the preferred embodiment of the present invention, mirror tracks 302F and 302R have essentially the same length and extend over a large portion of their respective sides 110F and 110R, respectively. However, mirror tracks 302F and 302R may be considerably shorter in length while still achieving the preferred lateral offset described above while providing sufficient lateral adjustment to accommodate individual drivers.

As noted above, sides 112L and 112R contain clip channels 304L and 304R, respectively. In FIG. 3, the clip channels 304 are illustrated as dashed lines extending along sides 112L and 112R beneath clips 114. The front-most clips 114LF and 114RF are preferably fixed in position at a predetermined location to ensure that the frame assembly 104 clears the front view window 206 while the rear-most clips 114LR and 114RR are adjustable along clip channels 304L and 304R, respectively. The front-most clips 114LF and 114RF of each clip pair may be adjusted along the same or different clip channels prior to being secured in their fixed position so that device 100 may be balanced in a substantially horizontal position when secured to relatively thin visors 118 while clearing the front view window. Having only one side of the opposing clips adjustable enables the device 100 to be easily adjusted to the size of the visor 118.

Mirror assembly 106 has a top surface 310 while the mirror assembly 108 has a top surface 312. Significantly, mirror assemblies 106 and 108 are substantially parallel with each other. That is, top surfaces 310 and 312 of mirrors 106 and 108 reside in respective planes which are substantially parallel with each other. Thus, from the top plan view of FIG. 3, mirror assemblies 106 and 108 are shown to be substantially parallel. The relative lateral position of substantially parallel mirrors enables the driver 208 to view the forward-most mirror 106 substantially unobstructed by the rear-most mirror, and provides the driver with the ability to adjust the mirrors in any desirable manner to obtain a view of a substantial area 218 external to the opposite side of the vehicle cab 200 lateral, forward, and below the level of the front view window 206 and front portion of the vehicle 200. This is further described in detail below.

Figure 4:
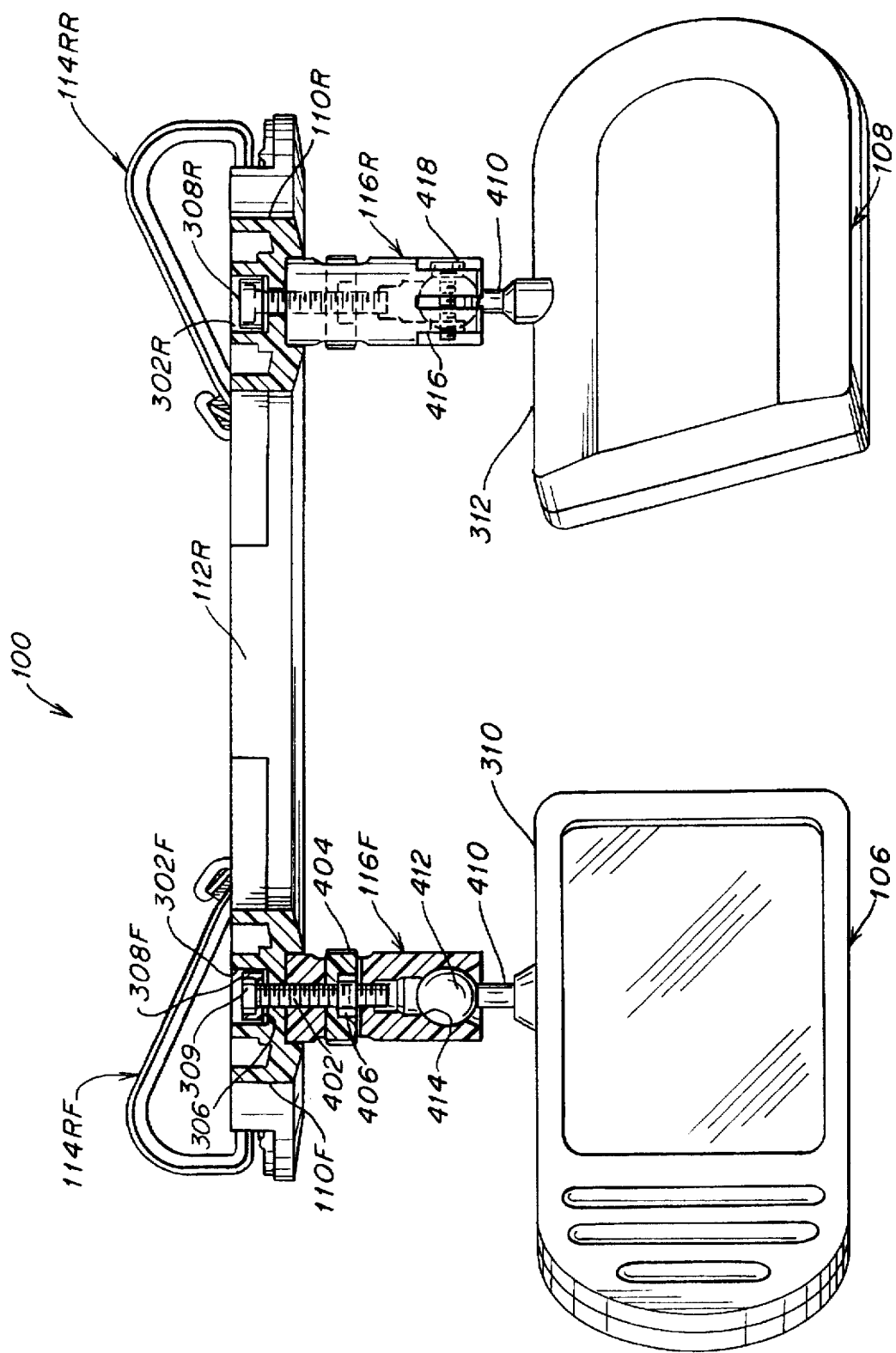
FIG. 4 is a left side view of the device providing various cross-sectional views of the frame assembly and mirror hangers and perspective views of mirror assemblies.

FIG. 4 is a left side view of the device 100 providing cross-sectional views of the frame assembly 104 and mirror hangers 116 and perspective views of mirror assemblies 106 and 108. Vertically adjustable clamps 308F and 308R reside in mirror tracks 302F and 302R, respectively. As shown in the cross-sectional view of adjustable clamp 308F, the hex-shaped bolt head 309 is recessed and captures the clamp 308. The hex nut 309 is part of a vertically adjustable bolt 402 that extends down through hangers 116. A thumb wheel 404 with a captured nut 406 controls the height of bolt 402 and hence clamp 308. When the thumb wheel 404 is rotated clockwise, the clamp 308, having opposing teeth (not shown) is secured against teeth 306 of channels 302. Likewise, when thumb wheel 404 is rotated counterclockwise, the teeth of hanger 308 are lifted off of teeth 306 to disengage the hanger 116. The associated mirror assembly may then be laterally adjusted along its respective track 302. This arrangement enables the driver to easily adjust the mirror assemblies along their respective mirror tracks 302 while providing a simple means for securing the mirror assemblies at a desired lateral position that is not adversely affected by the vibrations experienced in the vehicle.

The mirror assemblies 106 and 108 each have a post extending vertically from their top surface 310 and 312, respectively. As noted, the front-most mirror assembly 106 is positioned so as to capture an image of the rear-most mirror assembly 108. Thus, the front-most mirror assembly 106 is generally vertically positioned since the driver's eyes and the rear-most mirror assembly 108 are generally at the same level relative to the front-most mirror 106 and may be positioned from approximately −20° to +20° from the vertical axis of its associated hanger 116F. On the other hand, the rear-most mirror assembly 108 is positioned so as to capture an image lateral and forward of the position of device 100 below the level of the front view window 206 and front portion 204 of the vehicle 200. Therefore, the rear-most mirror 108 may be positioned from approximately 0° to 40° from the vertical axis of its associated hanger 116R. Accordingly, the post 410 extends off the top surface 312 of mirror assembly 108 at approximately 20°. This angle between the vertical axis of hanger 116R and the plane of the mirror 108 accommodates the range of adjustment experienced by the mirror assembly due to different vehicle configurations as well as due to different driver's physical dimensions, characteristics and preferred seating style.

At the end of posts 410 opposite the mirror assembly is a ball 412 configured to be received by a corresponding socket 414 in the respective hanger 116. A pivot ball clamping means 416, preferably in the form of a C-clamp and an associated screw 418 is provided for securing the ball 412 in its associated socket 414 when the mirror assemblies 106 and 108 are pivotally positioned in their desired position. This arrangement enables the driver to easily and reliably secure the mirrors in a desired optimal position. This position can then be safely relied upon by the driver for extended periods of time regardless of the vibration experienced by the vehicle.

Figure 5:
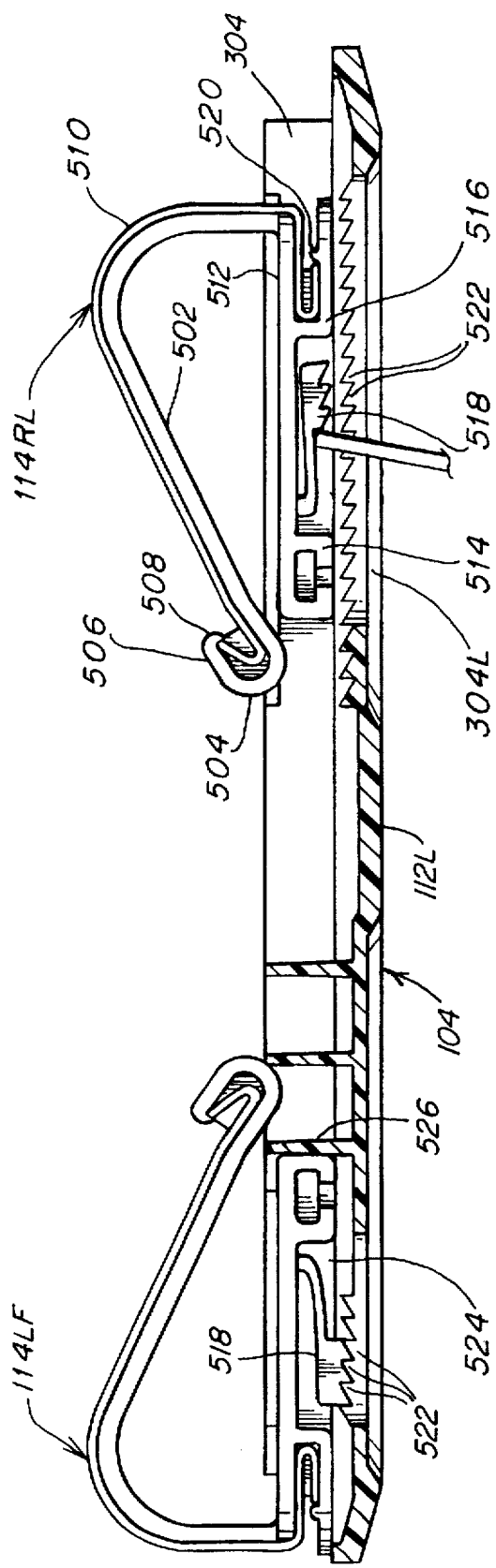
FIG. 5 is a cross-sectional view of frame assembly taken along section line 5—5 of FIG. 3, with the frame assembly 104 removed from the visor.

FIG. 5 is a cross-sectional view of frame assembly 104 taken along section line 5—5 of FIG. 3, with the frame assembly 104 removed from the visor 118 for clarity. The adjustable C-clips 114 have a central rib 502 that is C-shaped having a U-shaped upper spring bracket 504 at its distal end 506. The upper spring bracket 504 is integral with the central rib 502 with one side of the bracket being the central rib 502. The upper spring bracket 504 has a retaining ear 508 at its distal end to capture an end of a flat spring 510. The spring 510 may be secured to the C-clip 114, such as sonically swaging an integral pillar extending up from the C-clip through a channel in the spring 510.

The central rib 502 has an integral base that includes a track guide 514, lower spring bracket 516, and a locking means 518. The track guide 514 guides the clip 114 along its respective clip channel 304. The lower spring bracket 516 is a rectangular slot configured to receive flat spring 510 and has a retaining ledge 520 to secure an end of spring 510 in position. Locking means 518 is a flexible toothed projection extending downward from the base 512 to engage the teeth 522 of clip channel 304. The teeth of the projection 518 are one-way ratchet teeth configured to engage opposing one way ratchet teeth 522 of the clip channel. The clip channels 304 have an access channel through which an elongated object such as a screwdriver may be inserted to lift the projection 518 to disengage the opposing teeth. The clip 114 may then be adjusted along its respective clip channel away from the opposing clip while the locking means 518 is in its disengaged position. When released, the projection gain extends downward to its naturally-relaxed position to again engage the clip channel teeth. The one-way ratchet teeth enable the clip 114LR to be adjusted towards its opposing clip 114LF without having to manually disengage the teeth.

As noted above, in the preferred embodiment of the present invention, one of the opposing clips is secured to the frame 104 while the other opposing clip is adjustable along its respective clip channels. However, as noted above, in an alternative embodiment a second clip channel is provided in each of the sides 112 to provide the ability to initially adjust the stationary clips 114LF and 114RF prior to securing them in their fixed position. Accordingly, as shown in FIG. 5, a second clip channel 524 is provided in side 112L (a corresponding channel in 112R is not shown). The clip channel 524 provides a limited distance for clip 114LF to travel as shown by stop 526. As noted, this enables the opposing pair of clips 114LF and 114RF to be adjusted so that the device 100 is optimally balanced on visor 118.

Figure 6A:
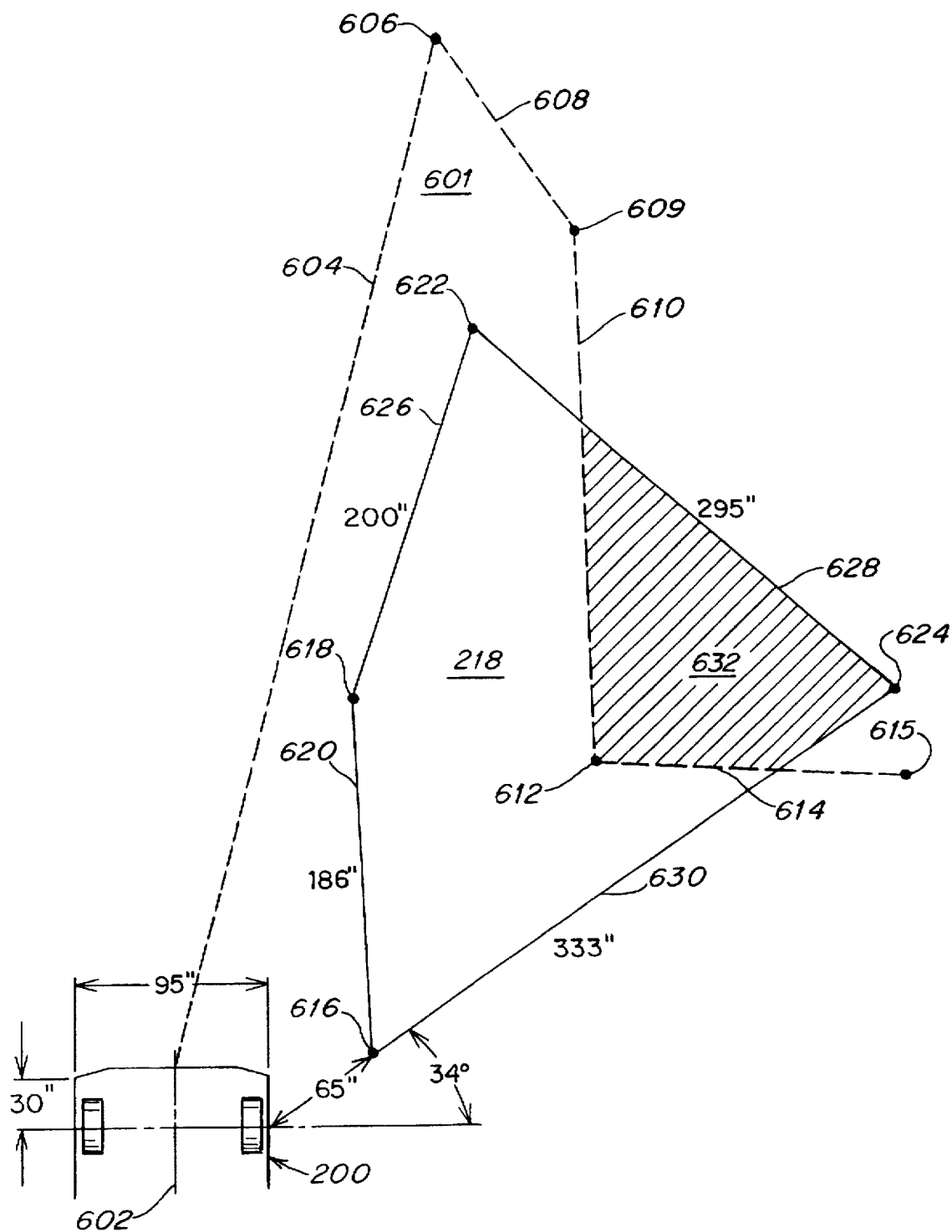
FIGS. 6A and 6B are schematic diagrams illustrating the relative size of an exemplary viewing area provided by the vehicular visual safety device of the present invention relative to the blind area caused by the vehicle structure.
Figure 6B:
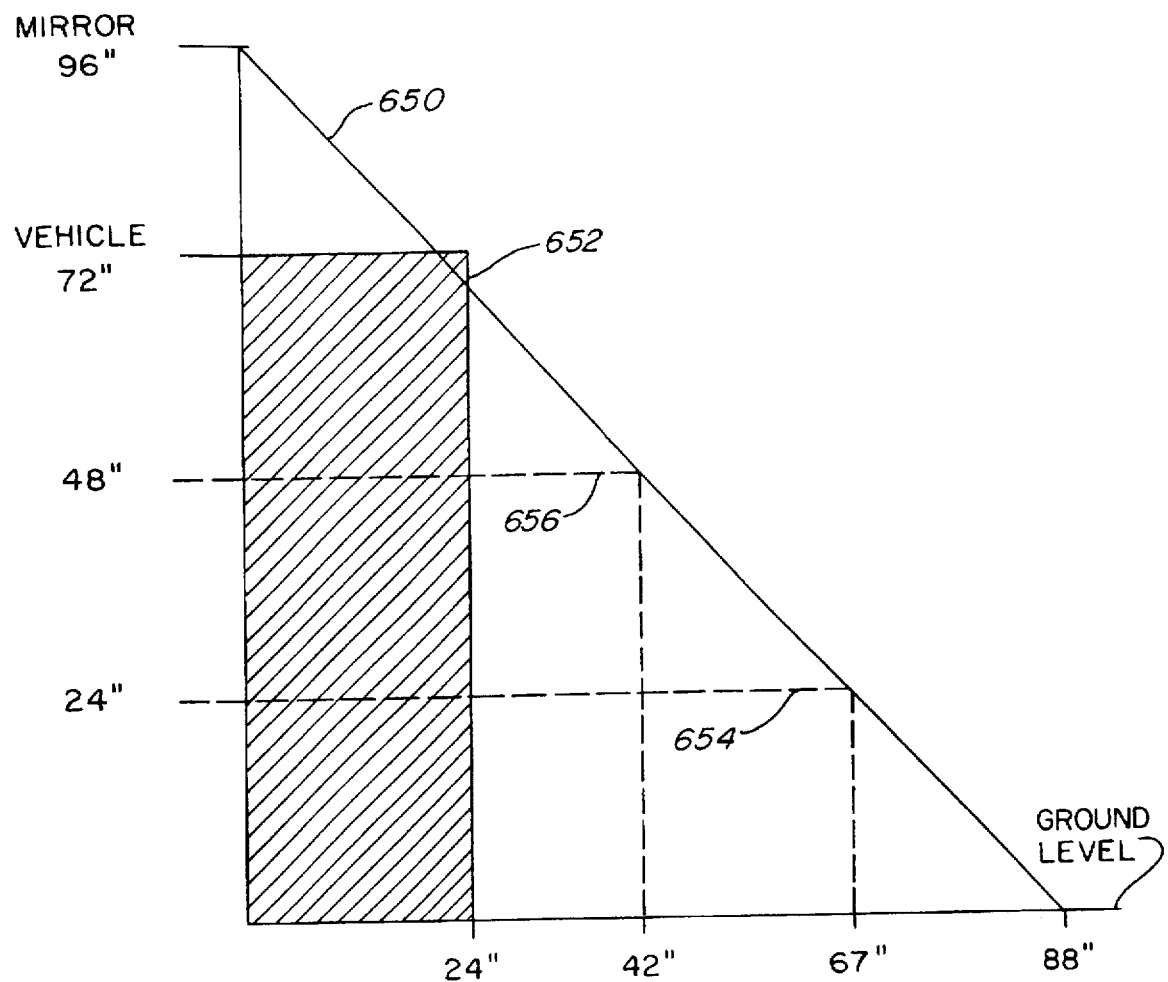

FIG. 6A is a schematic diagram showing an exemplary viewing area 218 provided by the device 100 of the present invention and a blind area 601 associated with an exemplary vehicle cab 200. As noted, the vehicle cab 200 is an illustrative truck cab having a width of approximately 95 inches and the front wheels approximately 30 inches offset from the front bumper. As shown in FIG. 6B the height of the hood of truck cab 200 is approximately 6 feet and the present invention approximately 8 feet above ground level. As shown in FIG. 6A the foremost point of center line 602 of the hood is aligned with point 606. Although the area that is obstructed by the vehicle extends to the driver's side of the vehicle, a boundary line 604 of blind area 601 is shown in FIG. 6A to emphasize that portion of the blind area pertinent to the present invention. This boundary line 604 extends from the truck cab 200 to point 606 forward of the cab. The blind area 601 has a boundary line 608 that is visually aligned with the corner of the hood and extends from point 606 to a point 609. A boundary line 610 of blind area 601 is visually aligned with the side of the hood opposite the driver and extends from point 609 to a point 612. The blind area 601 has a boundary line 614 that is visually aligned with a lower edge of the front view window 206 and extends from point 612 to a point 615.

In the illustrative embodiment shown in FIG. 6A, the ground-level viewing area 218 provided by the device 100 of the present invention is shown by a solid-line trapezoid. As shown in FIG. 6A, the viewing area 218 provided by the device 100 begins at approximately 65 inches away from the side of the vehicle at point 616. The exposed area 218 extends approximately 186 inches forward of the point 616 along boundary line 620 to a point 618. A boundary line 626 extends from point 618 to a point 622 approximately 200 inches from point 618. A boundary line 628 extends for approximately 295 inches from point 622 to point 624. Finally, a boundary line 630 extends approximately 333 inches from point 624 to return to point 616.

This viewing area 218 includes a significant portion of blind area 601 as shown in FIG. 6A. In addition, in the illustrative embodiment illustrated in FIG. 6A, the viewing area 218 also includes a portion of the ground not included in blind area 601. Thus, the mirror assemblies 106 and 108 may be adjusted to move the viewing area 218 closer to the truck cab 200 without sacrificing a significant or any portion of blind area 601. Thus, the 65 inch distance of viewing area 218 from truck cab 200 in FIG. 6A may be considerably reduced.

In addition, the viewing area 218 which is shown in FIG. 6A, includes only the ground area that is included in the image captured by the device 100. Typically, however a driver is concerned with an area having a certain minimal height. For example, if motorized vehicles are of concern, then the blind area of concern may extend from 6 feet down to 2 feet above ground level. The corresponding change in the viewing area 218 is shown in FIG. 6B.

In a conventional truck cab such as that shown in FIG. 2, the vehicle structure obstructing the driver's view is approximately 6 feet high. The mirror apparatus of the present invention would be approximately 8 feet from ground level. As shown in FIGS. 6A and 6B, the lower boundary line 650 of the field of view provided by the mirror apparatus 100 extends approximately 65 inches from the side panel 652 of the vehicle. As shown in FIG. 6B, the mirror apparatus 100 is approximately 2 feet from the side panel 652 (in the interior of the passenger compartment). A portion of the vehicle is included within the field of view as shown by the upper-right corner of the vehicle extended above the lower boundary line 650.

As noted above, the field of view 218 illustrated in FIG. 6A is that of an area at ground level. However, at a distance of 24 inches from ground level, the field of view extends towards the vehicle to approximately 67 inches from the mirror or 43 inches from the side panel of the vehicle as illustrated by dashed line 654. Likewise, at 48 inches from ground level, the field of view provided by the mirror apparatus of the present invention can extend to as close as 42 inches from the mirror or 18 inches from the side of the vehicle as shown by dashed line 656. Thus, a considerably larger area closer to the vehicle may be provided by the mirror apparatus of the present invention when the area of concern has a minimal height that is above ground level.

As noted above, in a preferred embodiment of the present invention, mirror pair 102 is secured to a roof structure, preferably visor 118, via frame assembly 104. In another preferred embodiment of the present invention, mirror hangers 116F and 116R are secured directly into tracks residing in the roof structure of the vehicle cab 202. In alternative embodiments, the device 100 of the present invention may be secured to other portions of the roof structure, including the back wall or the passenger door of the vehicle cab. Accordingly, in a preferred embodiment the brackets utilized to secure the frame apparatus 104 to the roof structure are opposing clip pairs 114. However, it should be appreciated that other types of brackets may be used which are appropriate for the selected roof structure to which the frame assembly is attached.

Figure 7A:
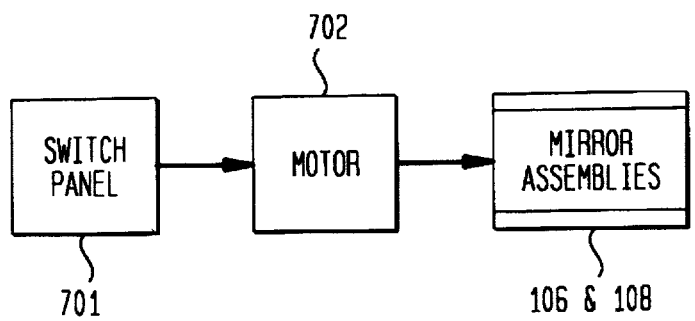
FIGS. 7A and 7B are block diagrams of alternative embodiments of the present invention wherein a motor is used to control the mirrors.
Figure 7B:
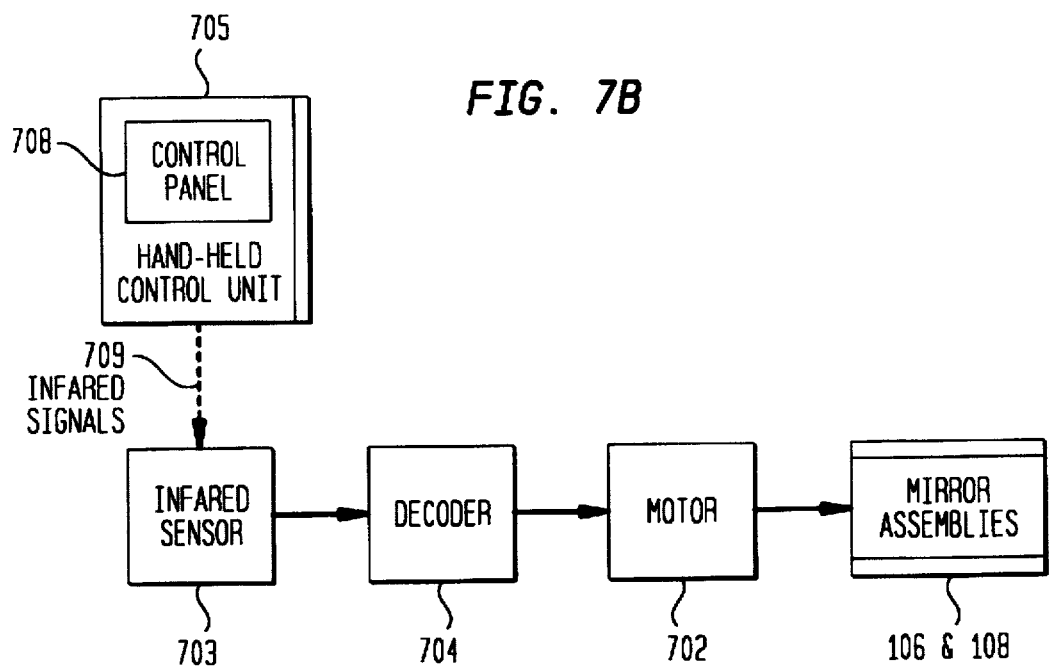

In a preferred embodiment of the present invention, the mirror assemblies 106 and 108 are comprised of a frame assembly providing an adhesive foam or adhesive skin backing to which the planar and convex object mirrors are secured. This prevents the mirrors from shattering when subjected to a severe shock. However, as one skilled in the relevant art would find apparent, mirror assemblies 106 and 108 may take on any configuration enabling them to be pivotally adjusted. In addition, the mirror assemblies 106 and 108 are laterally and pivotally adjusted manually in the illustrative embodiment. However, in another preferred embodiment of the present invention, illustrated in FIGS. 7A and 7B, the mirror assemblies 106 and 108 may be controlled via any well-known mechanical or motorized manner such as a system 702 under the control of a switch panel 701 adjacent to the driver's position. Alternatively, the motors may include an infrared sensor 703 and associated decoder 704 responsive to infrared signals 709. The apparatus 100 would also include a hand-held control unit 705 that generates appropriate infrared signals 709 and responds to the activation of a control panel 708 on the control unit 705. Such a mechanized control unit may provide the driver with the ability to laterally adjust the mirror assemblies along their respective tracks as well as to pivotally adjust the mirror assemblies.

It should also be appreciated that the mirrors 106 and 108 may take on other configurations. For example, front-most mirror 106 may be slightly concave to compensate for the foreshortening of the reflected image due to the distance between the mirrors 106 and 108. Other mirror configurations and sizes are considered to be apparent to those skilled in the relevant art. In addition, mirror tracks 302 and clip channels 304 may have other relative positions. For example, they may be substantially parallel, may reside in a common vertical plane, etc.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A mirror apparatus for providing a view, from a driver's position interior to and on one side of a passenger compartment of a vehicle, of an area external to a side of the vehicle opposite the driver's position, the area being lateral to, below and forward of a front view window of the vehicle, the apparatus comprising:

a first mirror having an upper edge residing in a first vertical plane;

a second mirror having an upper edge residing in a second vertical plane substantially parallel with said first plane; and means for securing said first and second mirrors within the passenger compartment of the vehicle on the side of the passenger compartment opposite the driver's position, and in fixed relationship to the vehicle, such that said first mirror is positioned adjacent to the front view window and said second mirror is positioned towards the rear of the vehicle relative to said first mirror, wherein said first mirror is laterally offset towards the driver's position relative to said second mirror such that said second mirror does not significantly obstruct a view of said first mirror from the driver's position, said first mirror positioned so as to reflect an image of said second mirror to the driver and said second mirror positioned so as to provide said first mirror with an image of the obstructed area, thereby providing the driver with a view of a substantial portion of the area external to the opposite side of the vehicle lateral to, below and forward of the front view window of the vehicle.

2. The mirror apparatus of claim 1, wherein said securing means comprises:

a frame having substantially parallel forward and rear tracks configured to adjustably receive said first and second mirrors, respectively, such that said first and second mirrors may be laterally adjusted along said respective tracks, wherein said first and second mirrors are adapted to be removably secured at any one of a plurality of locations along said respective forward and rear tracks.

3. The mirror apparatus of claim 2, wherein said securing means further comprises:

one or more brackets for securing said frame within the vehicle.

4. The mirror apparatus of claim 3, wherein said one or more brackets comprises:

one or more pairs of opposing clips for removably securing said frame to a visor within the vehicle.

5. The mirror apparatus of claim 4, wherein said one or more brackets further comprises:

one or more flat springs each configured to conform to a surface of a respective one of said one or more pairs of opposing clips.

6. The mirror apparatus of claim 5, wherein said one or more flat springs are sonically swaged to each of said respective one of said one or more clip surfaces.

7. The mirror apparatus of claim 4, wherein said frame further comprises first and second clip tracks; and wherein said one or more pairs of opposing clips comprises a first pair of opposing clips configured to travel within said first clip track, and a second pair of opposing clips configured to travel within said second clip tracks, wherein said first and second pairs of opposing clips are removably secured at any one of a plurality of locations along said respective first and second clip tracks.

8. The mirror apparatus of claim 4, wherein said frame further comprises first and second clip tracks, said one or more pairs of opposing clips comprising a first pair of opposing clips secured at one end of each of the said first and second clip tracks and a second pair of opposing clips, each configured to travel within a respective one of said first and second clip tracks, wherein said second pair of opposing clips are removably secured at any one of a plurality of locations along said respective first and second clip tracks.

9. The mirror apparatus of claim 2, wherein said first and second mirrors are rotatably secured to said frame.

10. The mirror apparatus of claim 9, further comprising:

means for remotely adjusting said first and second mirrors via motors and appropriate controls.

11. The mirror apparatus of claim 10, wherein said adjusting means comprises:

lateral adjust means for adjusting said first and second mirrors along said respective forward and rear tracks;

mirror adjust means for adjusting each of said first and second mirrors about any desired axis; and driver-actuated control means, operatively coupled to said lateral adjust means and to said mirror adjust means, for generating command inputs to effect positional and angular adjustments of said first and second mirrors.

12. The mirror apparatus of claim 11, wherein said driver-actuated control means comprises a switch panel adjacent to said driver's position.

13. The mirror apparatus of claim 11, wherein said driver-actuated control means comprises an infrared sensor and associated decoder responsive to infrared signals, generated by a control unit.

14. The mirror apparatus of claim 2, further comprising:

first and second hangers each interposed between a respective one of said first and second mirrors and said respective forward and rear tracks, wherein said first and second mirrors are rotatably secured to said respective hanger and said hanger is configured to travel along said forward and rear tracks.

15. The mirror apparatus of claim 14, wherein said hangers and said respective mirrors are rotatably coupled by a ball and socket type joint.

16. The mirror apparatus of claim 1, wherein said second mirror is a convex object mirror.

17. The mirror apparatus of claim 16, wherein said convex object mirror has a spherical radius of curvature.

18. The mirror apparatus of claim 1, wherein said first mirror is a planar reflecting mirror.

19. A vehicle cab comprising:

a passenger compartment having a front view window secured within a roof structure with multiple portions defining said passenger compartment, having a driver's position interior to and on one side of said passenger compartment;

a mirror assembly for providing the driver with a view of the side of the cab remote from the driver, said mirror assembly including, a first mirror having an upper edge residing in a first vertical plane, and a second mirror having an upper edge residing in a second vertical plane substantially parallel with said first vertical plane; and means for securing said mirror assembly to one of said portions of said roof structure within the passenger compartment such that said first and second mirrors are positioned on a side of said passenger compartment opposite the driver, with a rear-most mirror of said first and second mirrors is laterally offset from a front-most mirror of said first and second mirrors with respect to the driver.

20. The vehicle cab of claim 19, wherein said roof structure includes a visor.

21. A mirror apparatus for providing a view, from a driver's position interior to and on one side of a passenger compartment of a vehicle, of an area external to an opposite side of the vehicle lateral to and forward of the driver's position, the apparatus comprising:

a first mirror assembly having left and right sides and an upper edge residing in a first vertical plane;

a second mirror assembly having left and right sides and an upper edge residing in a second vertical plane substantially parallel with said first plane; and means for securing said first and second mirror assemblies interior to said passenger compartment of said vehicle, on a side of said passenger compartment opposite to said position of said driver, and in fixed relationship to the driver's position such that said first mirror is positioned adjacent to a front view window and said second mirror is positioned towards the rear of the vehicle relative to said first mirror, wherein said first mirror is laterally offset towards the driver's position relative to said second mirror, such that said left side of said second mirror does not substantially overlap with said right side of said first mirror thereby providing a substantially complete view of an image in said first mirror from the driver's position.

22. A truck cab having a roof structure with multiple portions and a front view window defining a passenger compartment, and having a restricted view of a side of the cab remote from a driver's position, comprising:

a pair of mirrors, including,
- a first mirror having an upper edge residing in a first vertical plane, and
- a second mirror having an upper edge residing in a second vertical plane substantially parallel with said first vertical plane;

means for securing said pair of mirrors to a portion of the roof structure of the cab within the passenger compartment of the cab and in fixed relation with the driver's position, said mirrors positioned such that a rear-most mirror of said first and second mirrors is laterally offset from the driver relative to a forward-most mirror of said first and second mirrors so as not to interfere with a view of the forward-most mirror from the driver's position.

23. A mirror apparatus for providing a view, from a driver's position on one side of a vehicle having a driver's compartment, of an area external to an opposite side of the vehicle forward of and below the mirror apparatus, comprising:

- a first mirror having an upper edge residing in a first vertical plane;
- a second mirror having an upper edge residing in a second vertical plane substantially parallel with said first plane; and
- a frame assembly configured to secure said first and second mirrors within the driver's compartment on a side of the driver's compartment opposite the driver's position in fixed relationship to the driver's position such that said first mirror is positioned adjacent to a front view window and said second mirror is positioned towards the rear of the vehicle relative to said first mirror, and wherein said second mirror is laterally offset away from the driver's position relative to said first mirror such that said second mirror does not obstruct a view of said first mirror from the driver's position.

24. A mirror apparatus for providing a view, from a driver's position interior to and on one side of a vehicle, of an area external to an opposite side of the vehicle lateral to, below and forward of a front view window of the vehicle, an unassisted view of an area which is obstructed by the vehicle, the apparatus comprising:

- a first mirror having an upper edge residing in a first vertical plane;
- a second mirror having an upper edge residing in a second vertical plane substantially parallel with said first plane; and
- means for securing said first and second mirrors interior to a passenger compartment of said vehicle, on a side of said passenger compartment opposite to said position of said driver, and such that said first mirror is positioned adjacent to the front view window and said second mirror is positioned towards the rear of the vehicle relative to said first mirror, wherein said securing means includes a frame having substantially parallel forward and rear tracks configured to adjustably receive said first and second mirrors, respectively, such that said first and second mirrors may be laterally adjusted along said respective tracks, wherein said first and second mirrors are adapted to be removably secured at any one of a plurality of locations along said respective forward and rear tracks; and
- wherein said first mirror is laterally offset towards the driver's position relative to said second mirror such that said second mirror does not significantly obstruct a view of said first mirror from the driver's position, said first mirror positioned so as to reflect an image of said second mirror to the driver and said second mirror positioned so as to provide said first mirror with an image of the obstructed area, thereby providing the driver with a view of a substantial portion of the otherwise obstructed area.

25. The mirror apparatus of claim 24, wherein said first and second mirrors are rotatably secured to said frame.

26. The mirror apparatus of claim 25, further comprising:
means for remotely adjusting said first and second mirrors via motors and appropriate controls.

27. The mirror apparatus of claim 26, wherein said remotely adjusting means comprises:
- lateral adjust means for adjusting said first and second mirrors along said respective forward and rear tracks;
- mirror adjust means for adjusting each of said first and second mirrors about any desired axis; and
- a driver-actuated control means, electrically coupled to said lateral adjust means and to said mirror adjust means, for generating command inputs to effect positional and angular adjustments of said first and second mirrors.

* * * * *